(12) United States Patent
Kohzai et al.

(10) Patent No.: US 10,746,620 B2
(45) Date of Patent: Aug. 18, 2020

(54) PRESSURE MEASURE SHEET, METHOD OF MANUFACTURING A PRESSURE MEASURE SHEET, AND PRESSURE MEASURING METHOD

(71) Applicants: JAPAN AEROSPACE EXPLORATION AGENCY, Chofu-shi, Tokyo (JP); TOKYO FLUID RESEARCH CO., LTD., Tokyo (JP)

(72) Inventors: Masataka Kohzai, Tokyo (JP); Yuzuru Yokokawa, Tokyo (JP); Kazuomi Yamamoto, Tokyo (JP); Yasushi Ito, Tokyo (JP); Hideo Omotani, Tokyo (JP)

(73) Assignees: JAPAN AEROSPACE EXPLORATION AGENCY, Tokyo (JP); TOKYO FLUID RESEARCH CO., LTD., Tokyo (JP)

( * ) Notice: Subject to any disclaimer, the term of this patent is extended or adjusted under 35 U.S.C. 154(b) by 133 days.

(21) Appl. No.: 16/171,536

(22) Filed: Oct. 26, 2018

(65) Prior Publication Data
US 2019/0128759 A1 May 2, 2019

(30) Foreign Application Priority Data
Nov. 1, 2017 (JP) ................................. 2017-211558

(51) Int. Cl.
| | |
|---|---|
| *G01L 15/00* | (2006.01) |
| *G01L 19/14* | (2006.01) |
| *G01L 19/00* | (2006.01) |
| *B64D 45/00* | (2006.01) |

(52) U.S. Cl.
CPC .............. *G01L 15/00* (2013.01); *B64D 45/00* (2013.01); *G01L 19/0038* (2013.01); *G01L 19/14* (2013.01)

(58) Field of Classification Search
USPC ....................................... 73/170.02, 700–756
See application file for complete search history.

(56) References Cited

U.S. PATENT DOCUMENTS

| | | | | |
|---|---|---|---|---|
| 5,050,035 A | * | 9/1991 | Hegner | G01L 9/0075 29/25.42 |
| 6,719,222 B2 | * | 4/2004 | Mebberson | B29C 51/26 239/548 |
| 2005/0188759 A1 | * | 9/2005 | Omotani | G01M 9/065 73/170.02 |

(Continued)

FOREIGN PATENT DOCUMENTS

JP 2006-184215 A 7/2006

*Primary Examiner* — Andre J Allen
(74) *Attorney, Agent, or Firm* — Westerman, Hattori, Daniels & Adrian, LLP

(57) ABSTRACT

A pressure measure sheet having a sheet shape and having a pressure measure surface, the pressure measure sheet being adapted to be arranged on a surface of a measured object, includes: a plurality of pressure measure ports provided through the pressure measure surface; at least one connection port adapted to be connected to a side of a pressure measure device; and a coupler part including a plurality of through-tubes penetrating the plurality of pressure measure ports and the at least one connection port, in which the pressure measure sheet includes a region in which the plurality of through-tubes are arrayed in nonparallel.

7 Claims, 7 Drawing Sheets

(56) References Cited

U.S. PATENT DOCUMENTS

| | | |
|---|---|---|
| 2006/0156805 A1 | 7/2006 | Sawada |
| 2018/0224346 A1* | 8/2018 | Kawaguchi .............. G01L 9/12 |
| 2018/0266906 A1* | 9/2018 | Bocciolone .............. G01P 1/08 |
| 2020/0003634 A1* | 1/2020 | Hayashi ................... G01L 1/14 |

* cited by examiner ated direction of the pressure measure sheet, and may be
PRESSURE MEASURE SHEET, METHOD OF MANUFACTURING A PRESSURE MEASURE SHEET, AND PRESSURE MEASURING METHOD

INCORPORATION BY REFERENCE

This application claims the benefit of Japanese Priority Patent Application JP 2017-211558 filed Nov. 1, 2017, the entire contents of which are incorporated herein by reference.

FIELD

The present disclosure relates to a pressure measure sheet for measuring a pressure distribution of a surface of a flap of an aircraft, for example, a method of manufacturing the pressure measure sheet, and a pressure measuring method using the pressure measure sheet.

BACKGROUND

There is known a method of providing a pressure detection hole through a surface of a flap of an aircraft to measure a pressure distribution of the surface of the flap. However, this method is not preferable since it is necessary to process a flap.

According to another method, a bundle of tubes having pressure detection holes is attached on a surface of a flap in a flow direction. The tubes are attached on the surface of the flap such that the pressure detection holes are arranged at desired positions accurately, which is burdensome and low in workability. In addition, the tubes may cause airflow turbulence on the surface of the flap. A pressure distribution of the surface of the flap may not be measured accurately.

Meanwhile, according to a known technology, a flexible sheet-shape member has a plurality of pressure paths extending in parallel, the plurality of pressure paths have pressure detection holes, respectively, and the flexible sheet-shape member is arranged on a surface of a flap of an aircraft.

The aforementioned sheet-shape member is molded by extrusion molding. So a direction of the pressure paths is limited to the extrusion direction. As a result, the pressure detection holes may not be arranged at desired positions. For example, in the aforementioned sheet-shape member, the plurality of pressure detection holes may not be arranged on a straight line in a plan view of the pressure measure sheet through a pressure measure surface in a flow direction of fluid flowing on a surface of a measured object.

In view of the aforementioned circumstances, it is desirable to provide a pressure measure sheet capable of detecting a pressure distribution of desired positions on a surface of a measured object easily and accurately without processing the surface of the measured object. It is further desirable to provide a method of manufacturing the pressure measure sheet and a pressure measuring method using the pressure measure sheet.

SUMMARY

According to an embodiment of the present disclosure, a pressure measure sheet has a sheet shape and has a pressure measure surface, the pressure measure sheet is adapted to be arranged on a surface of a measured object, and the pressure measure sheet includes: a plurality of pressure measure ports provided through the pressure measure surface; at least one connection port adapted to be connected to a side of a pressure measure device; and a coupler part including a plurality of through-tubes penetrating the plurality of pressure measure ports and the at least one connection port, in which the pressure measure sheet includes a region in which the plurality of through-tubes are arrayed in nonparallel.

According to an embodiment of the present disclosure, since a plurality of through-tubes are arrayed in nonparallel in a pressure measure sheet having a sheet shape arranged on a surface of a measured object, pressure measure ports may be arranged freely at desired positions. Therefore it is possible to detect a pressure distribution of desired positions on a surface of a measured object easily and accurately without processing the surface of the measured object.

According to an embodiment of the present disclosure, the plurality of through-tubes may be provided in an elongated direction of the pressure measure sheet, and may be the pressure measure sheet may include a laminated structure laminated in the elongated direction. In order to measure a pressure of a surface of a measured object accurately, it is required to make the thickness of the sheet as small as possible. As a result, the through-tubes are thin. However, since the pressure measure sheet is a laminated structure in which layers are laminated in an elongated direction, it is possible to provide the through-tubes with a high degree of accuracy without clogging the through-tubes.

According to an embodiment of the present disclosure, the pressure measure sheet may further include a device accommodation part adapted to accommodate a device, in which the coupler part may include a coupling groove on a surface facing the surface of the measured object, the coupling groove being adapted to route wiring connected to the device accommodated in the device accommodation part. As a result, device may be accommodated easily and wiring may be routed to a device easily. Further, the device accommodation part accommodates devices such as a non-stationary pressure sensor and a temperature measuring device. Then various physical amounts of the surface of the measured object may be measured.

According to an embodiment of the present disclosure, typically, the plurality of pressure measure ports are arrayed on a straight line in a plan view of the pressure measure sheet in a flow direction of fluid adapted to flow on a surface of the measured object. Therefore a pressure distribution may be measured accurately in a flow direction of fluid flowing on the surface of the measured object.

According to an embodiment of the present disclosure, the measured object may be a flap of an aircraft, the pressure measure sheet may be adapted to be arranged on a topside, a rim part, and an underside of the flap of the aircraft, and the at least one connection port may be adapted to be positioned at the underside of the flap of the aircraft. Therefore a pressure distribution of a surface of a flap of an aircraft may be measured more accurately. Further, if the pressure measure ports are provided through the rim part, a pressure distribution of a surface of the rim part may be measured.

According to an embodiment of the present disclosure, a method of manufacturing a pressure measure sheet, the pressure measure sheet having a pressure measure surface, the pressure measure sheet being adapted to be arranged on a surface of a measured object, the pressure measure sheet including a plurality of pressure measure ports provided through the pressure measure surface, at least one connection port adapted to be connected to a side of a pressure measure device, and a coupler part including a through-tube penetrating the plurality of pressure measure ports and the at least one connection port, the through-tube being provided in an elongated direction, the method of manufacturing a pressure measure sheet includes: laminating thin layers in the elongated direction of the pressure measure sheet by a laminated object manufacturing method to fabricate a single body including the plurality of pressure measure ports, the at least one connection port, and the coupler part. According to the manufacturing method, it is possible to provide the through-tubes with a high degree of accuracy without clogging the through-tubes.

According to an embodiment of the present disclosure, a pressure measuring method includes: arranging a pressure measure sheet on a surface of a measured object, the pressure measure sheet having a pressure measure surface, the pressure measure sheet at least including a plurality of pressure measure ports provided through the pressure measure surface, the plurality of pressure measure ports being arrayed on a straight line in a plan view of the pressure measure sheet in a flow direction of fluid adapted to flow on the surface of the measured object; connecting a connection port to a side of a pressure measure device, the pressure measure sheet including through-tubes, the through-tubes penetrating the connection port and the plurality of pressure measure ports, respectively; and measuring a pressure of each of the plurality of pressure measure ports by the pressure measure device. Therefore a pressure distribution may be measured accurately in a flow direction of fluid flowing on the surface of the measured object.

According to the present disclosure, it is possible to detect a pressure distribution of desired positions on a surface of a measured object easily and accurately without processing the surface of the measured object. These and other objects, features and advantages of the present disclosure will become more apparent in light of the following detailed description of best mode embodiments thereof, as illustrated in the accompanying drawings.

DETAILED DESCRIPTION

Hereinafter, an embodiment of the present disclosure will be described with reference to the drawings.

In an example, a pressure distribution of a flap of an aircraft is measured by using pressure measure sheets of an embodiment of the present disclosure. Such an embodiment will be described.

<Structure of Pressure Measure Sheet>

Figure 1:
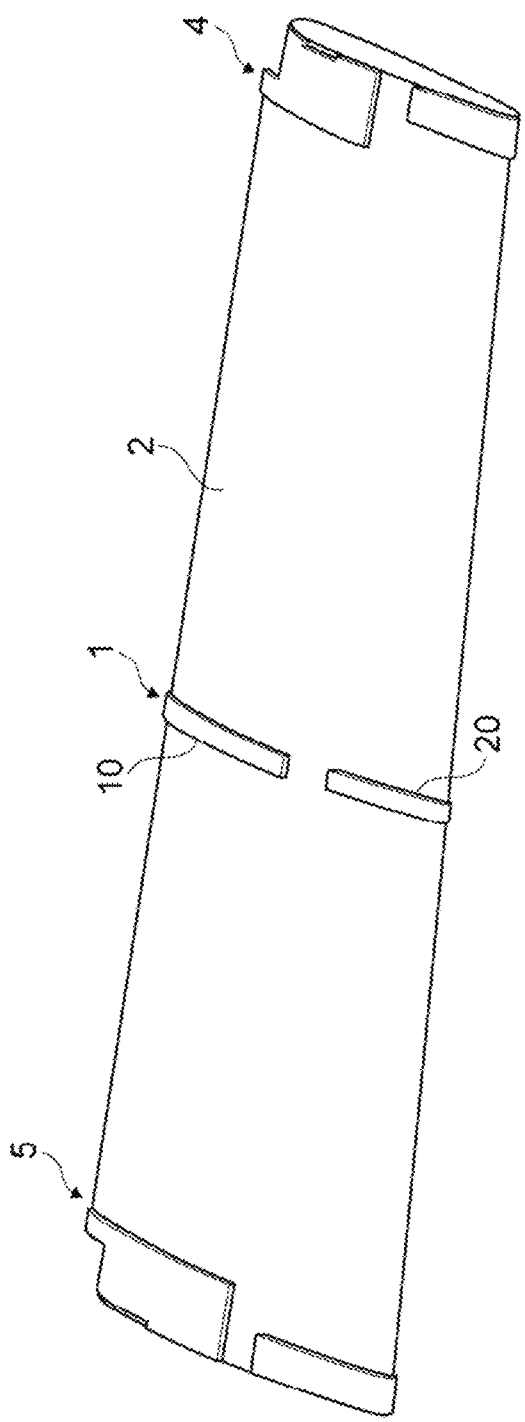
FIG. 1 is a perspective view showing pressure measure sheets according to an embodiment of the present disclosure arranged on a flap of an aircraft.

FIG. 1 is a perspective view showing pressure measure sheets arranged on a flap of an aircraft.

Each of the pressure measure sheets 1, 4, and 5 has a belt shape and is arranged on the topside and the underside of the flap 2 of an aircraft. The pressure measure sheet 1 is arranged on a central part of the flap 2. The pressure measure sheet 4 is arranged on an outer board of the flap 2. The pressure measure sheet 5 is arranged on an inner board of the flap 2.

According to an embodiment, the thickness of each of the pressure measure sheets 1, 4, and 5 is, for example, about 2 mm to 3 mm, and is equal to or smaller than 0.1% of the chord length of the flap 2. According to such a structure, airflow turbulence may be reduced. Each of the pressure measure sheets 1, 4, and 5 is made of, typically, an epoxy-series or urethane-series photo-curable resin material, and is fabricated by a laminated object manufacturing method such as a photo-solidification method. Each of the pressure measure sheets 1, 4, and 5 is, for example, adhered to and fixed to a surface of the flap 2 with an adhesive. Each of the pressure measure sheets 1, 4, and 5 may be made of not only an epoxy-series or urethane-series photo-curable resin material but also a metal material or the like.

Figure 2:
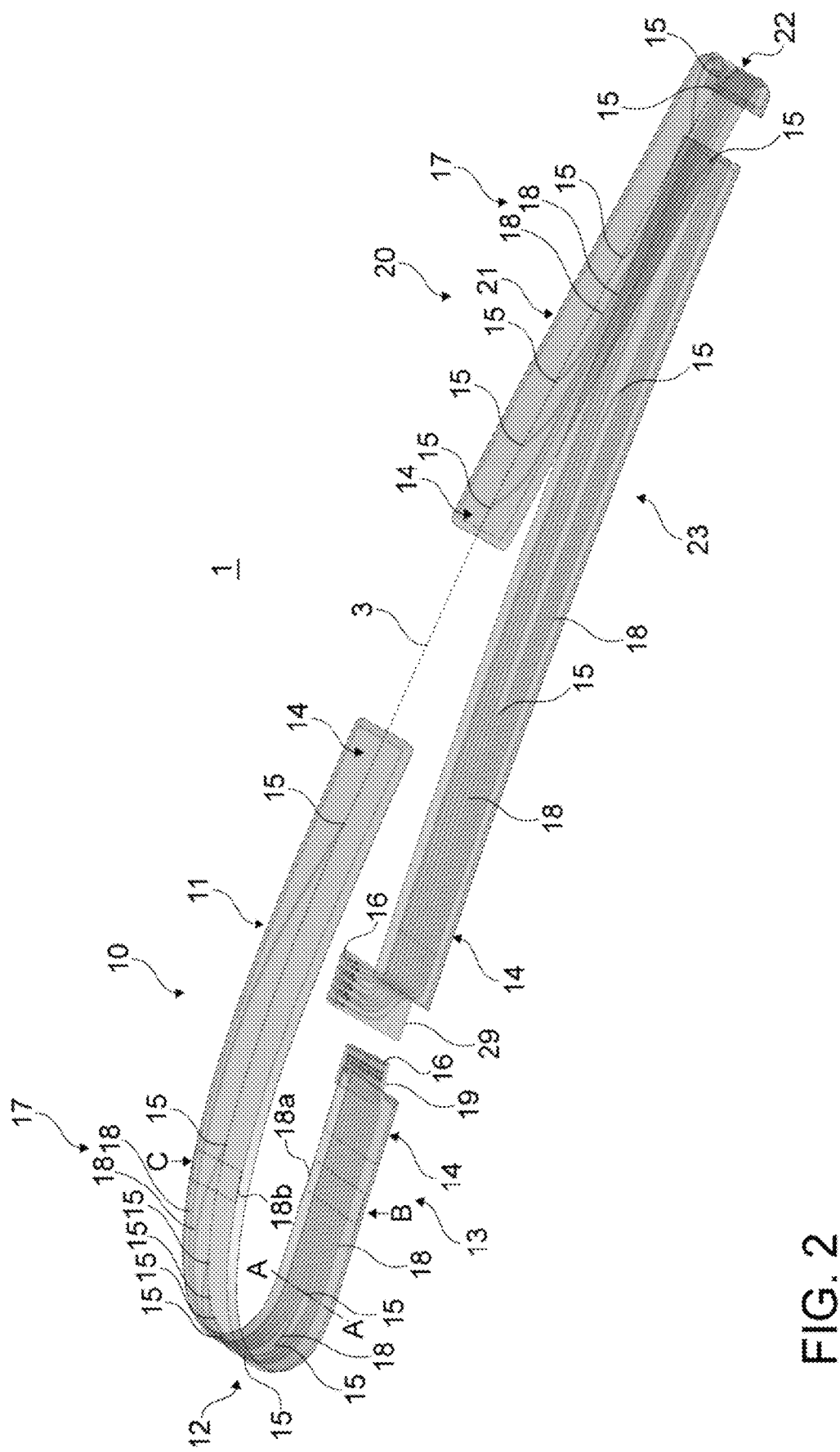
FIG. 2 is a perspective view showing the pressure measure sheet arranged on a central part of the flap of FIG. 1.

FIG. 2 is a perspective view showing the pressure measure sheet 1 arranged on a central part of the flap 2.

The pressure measure sheet 1 includes the first pressure measure sheet 10 and the second pressure measure sheet 20. The first pressure measure sheet 10 is arranged on the topside and the underside of a front half region of the flap 2 such that the first pressure measure sheet 10 is arranged over a front rim of the flap 2. The second pressure measure sheet 20 is arranged on the topside and the underside of a rear half region of the flap 2 such that the first pressure measure sheet 10 is arranged over a rear rim of the flap 2. The pressure measure sheet 1 is divided in this manner. According to such a structure, the pressure measure sheet 1 may be arranged on a region of the flap 2 over a whole circumference with simple work. The pressure measure sheets 4 and 5 are structured similarly. Note that each of the pressure measure sheets 1, 4, and 5 may be arranged on not a region of the flap 2 over the whole circumference but an arbitrary partial region.

The first pressure measure sheet 10 includes the topside part 11, the front rim side part 12, and the underside part 13. The topside part 11 is arranged on a topside surface of the flap 2, and has an approximately flat shape. The front rim side part 12 is arranged on a front rim side surface of the flap 2, and is curved in an elongated direction. The underside part 13 is arranged on an underside surface of the flap 2, and has an approximately flat shape. The topside part 11, the front rim side part 12, and the underside part 13 structure a single body. Since the first pressure measure sheet 10 is structured as a single body, work for connection such as piping connection may be reduced and, in addition, strength may be increased.

The first pressure measure sheet 10 includes the plurality of pressure measure ports 15, the plurality of connection ports 16, and the coupler part 17. The plurality of pressure measure ports 15 are provided through the pressure measure surface 14. The plurality of connection ports 16 are connected to a side of a pressure measure device. The coupler part 17 couples the pressure measure ports 15 and the connection ports 16.

The plurality of pressure measure ports 15 are arrayed, typically, straight (on a straight line in a plan view of the pressure measure sheet 1) in a flow direction (typically, dotted line 3 of FIG. 2) of fluid flowing on the surface of the flap 2. According to such a structure, a pressure distribution may be measured accurately in the flow direction of the fluid flowing on the surface of the flap 2.

The plurality of connection ports 16 are provided in the interface part 19 at an end part of the underside part 13. The plurality of connection ports 16 are, typically, connected to a pressure measure device from an inlet port provided through the underside of the flap 2 via stainless pipes and vinyl tubes (each of them are not shown). The pressure measure device is arranged inside the flap 2. The pressure measure device includes a pressure converter and a pressure distribution monitor. The pressure converter measures changes of pressure as a voltage. Measured data is converted into pressure by using a conversion factor, and pressure data is stored.

The interface part 19 is continuous with the underside part 13 of the single body. The interface part 19 is below the underside of the flap 2 stepwise inward. Since the interface part 19 is below the underside of the flap 2, turbulence of flow of fluid resulting from connection structure such as piping connected to the interface part 19 may be reduced.

Figure 3:
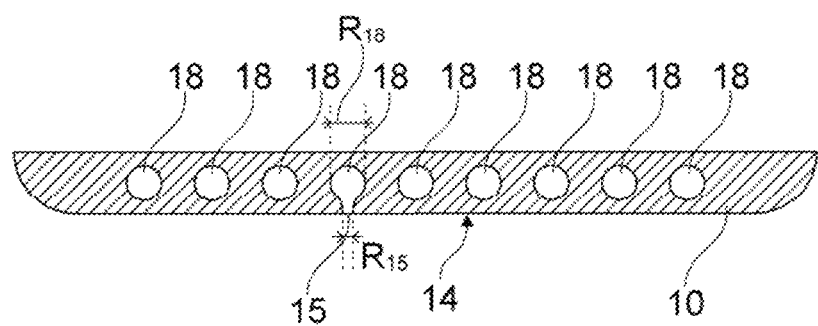
FIG. 3 is an A-A sectional view of FIG. 2.

FIG. 3 is an A-A sectional view of FIG. 2.

The coupler part 17 includes the plurality of through-tubes 18. The plurality of through-tubes 18 penetrate the pressure measure ports 15 and the connection ports 16 inside the sheet.

A diameter of the through-tube 18 of the present embodiment is 1.2 mm. The diameter of the through-tube 18 is required to be reduced in order to make the thickness of the pressure measure sheet as small as possible. Meanwhile, the length of the through-tube 18 may be extremely large in some cases. It is necessary to fabricate the through-tube 18 without clogging. So decrease of the diameter of the through-tube 18 has a limit. Accordingly, the diameter of 1.2 mm is employed with respect to the thickness of 2 mm of the pressure measure sheet. Further, as a result of a strength experiment, the inventors confirmed that a sheet, which has the total thickness of 2.0 mm (diameter of 1.2 mm and sheet thickness of 0.4 mm of both sides), has an enough strength during measurement.

According to an embodiment, the diameter $R_{15}$ of the pressure measure port 15 is, for example, smaller than the diameter $R_{18}$ of the through-tube 18. According to the present embodiment, the diameter $R_{15}$ of the pressure measure port 15 is 0.5 mm. If the diameter $R_{15}$ of the pressure measure port 15 is large, the surface shape of a wing is changed. So, according to an embodiment, the diameter $R_{15}$ is as small as possible. The pressure measure port 15 having the diameter $R_{15}$ of 0.5 mm may be fabricated actually. So the diameter $R_{15}$ of 0.5 mm is employed.

Figure 4:
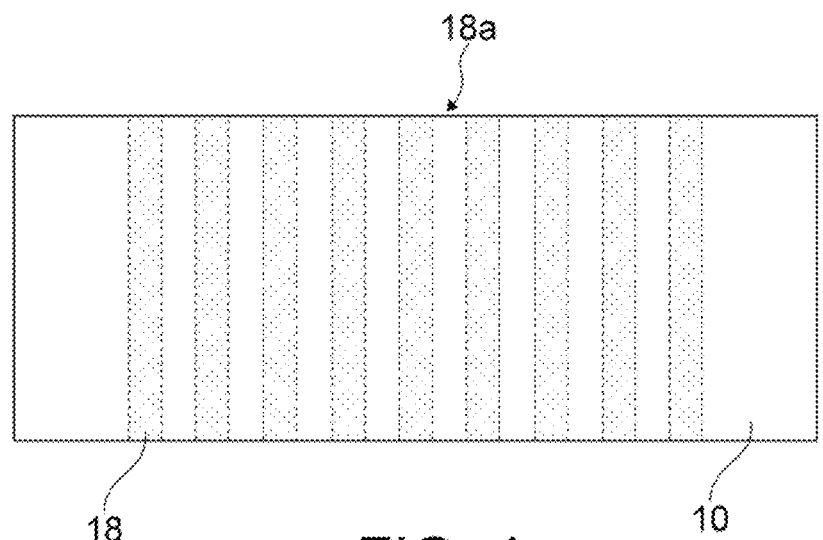
FIG. 4 is an enlarged plan view showing a region B of FIG. 2.
Figure 5:
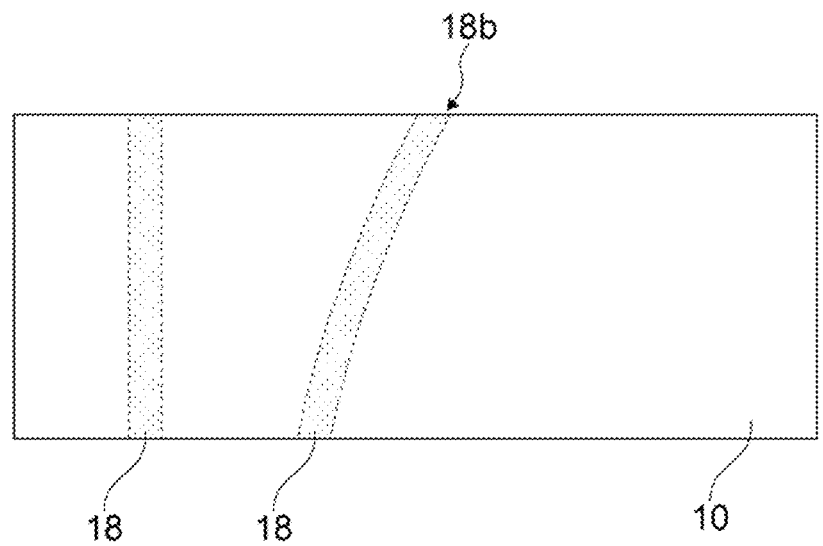
FIG. 5 is an enlarged plan view showing a region C of FIG. 2.

FIG. 4 is an enlarged plan view showing a region B of FIG. 2. FIG. 5 is an enlarged plan view showing a region C of FIG. 2.

As shown in FIG. 4, the first pressure measure sheet 10 includes the region 18a in which the plurality of through-tubes 18 are arranged in parallel. As shown in FIG. 5, the first pressure measure sheet 10 includes the region 18b in which the plurality of through-tubes 18 are arrayed in nonparallel.

In the region 18a in which the plurality of through-tubes 18 are arranged in parallel, typically, through-tubes 18 are arranged in a direction that is the same as the elongated direction of the first pressure measure sheet 10.

Near the region 18b in which the plurality of through-tubes 18 are arrayed in nonparallel, at least one through-tube 18 is arrayed in nonparallel with the other through-tubes 18. The at least one nonparallel through-tube 18 is, typically, arrayed in a direction inclined a predetermined angle from the elongated direction of the first pressure measure sheet 10.

Since the first pressure measure sheet 10 includes the region 18b in which the plurality of through-tubes 18 are arrayed in nonparallel, the pressure measure ports 15 may be arranged freely at desired positions. Typically, the plurality of pressure measure ports 15 may be arrayed straight in a flow direction (typically, dotted line 3 of FIG. 2) of fluid flowing on the surface of the flap 2. As a result, a pressure distribution may be measured accurately in the flow direction of fluid flowing on the surface of the flap 2. According to the technology disclosed in Japanese Patent Application Laid-open No. 2006-184215, as different from the present embodiment, a plurality of pressure measure ports may not be arrayed straight in a flow direction of fluid flowing on a surface of a flap. So it is necessary to arrange pressure measure ports somewhat staggered, with which the measurement accuracy is unsatisfactory. It is extremely important to design a noiseless flap of an aircraft or the like. So it is required to measure a pressure of a surface of a flap more and more accurately than before. It is important and desirable to measure a pressure accurately. According to the present embodiment, the plurality of pressure measure ports 15 may be arrayed straight in the flow direction of fluid flowing on the surface of the flap 2. As a result, a pressure distribution may be measured accurately in the flow direction of fluid flowing on the surface of the flap 2.

The structure of the second pressure measure sheet 20 is approximately similar to the aforementioned structure of the first pressure measure sheet 10. The same reference numerals are assigned to the similar structural parts, and description thereof will be omitted.

The second pressure measure sheet 20 has a single body including the topside part 21 and the rear rim side part 22, and the underside part 23. The topside part 21 is arranged on the topside surface of the flap 2, and has an approximately flat shape. The rear rim side part 22 is arranged on a rear rim side surface of the flap 2, and is curved in the elongated direction. The underside part 23 is separated from the topside part 21 and the rear rim side part 22. The underside part 23 is arranged on the underside surface of the flap 2, and has an approximately flat shape. The through-tubes 18 of the rear rim side part 22 are coupled to the through-tubes 18 of the underside part 23 via stainless pipes (not shown). To employ such a separate structure may support a case in which a measurement range by one pressure measure device is long.

In addition, the interface part 19 at an end part of the underside part 13 of the first pressure measure sheet 10 faces the elongated direction. To the contrary, the interface part 29 at an end part of the underside part 23 of the second pressure measure sheet 20 faces a direction perpendicular to the elongated direction. Further, the interface part 29 protrudes to the side of the flap 2 larger such that the interface part 29 is arranged more inside the flap 2 than the interface part 19. In this way, according to the present embodiment, the pressure measure sheet 1 has the interface parts 19 and 29 that face desired directions at desired positions.

Figure 6:
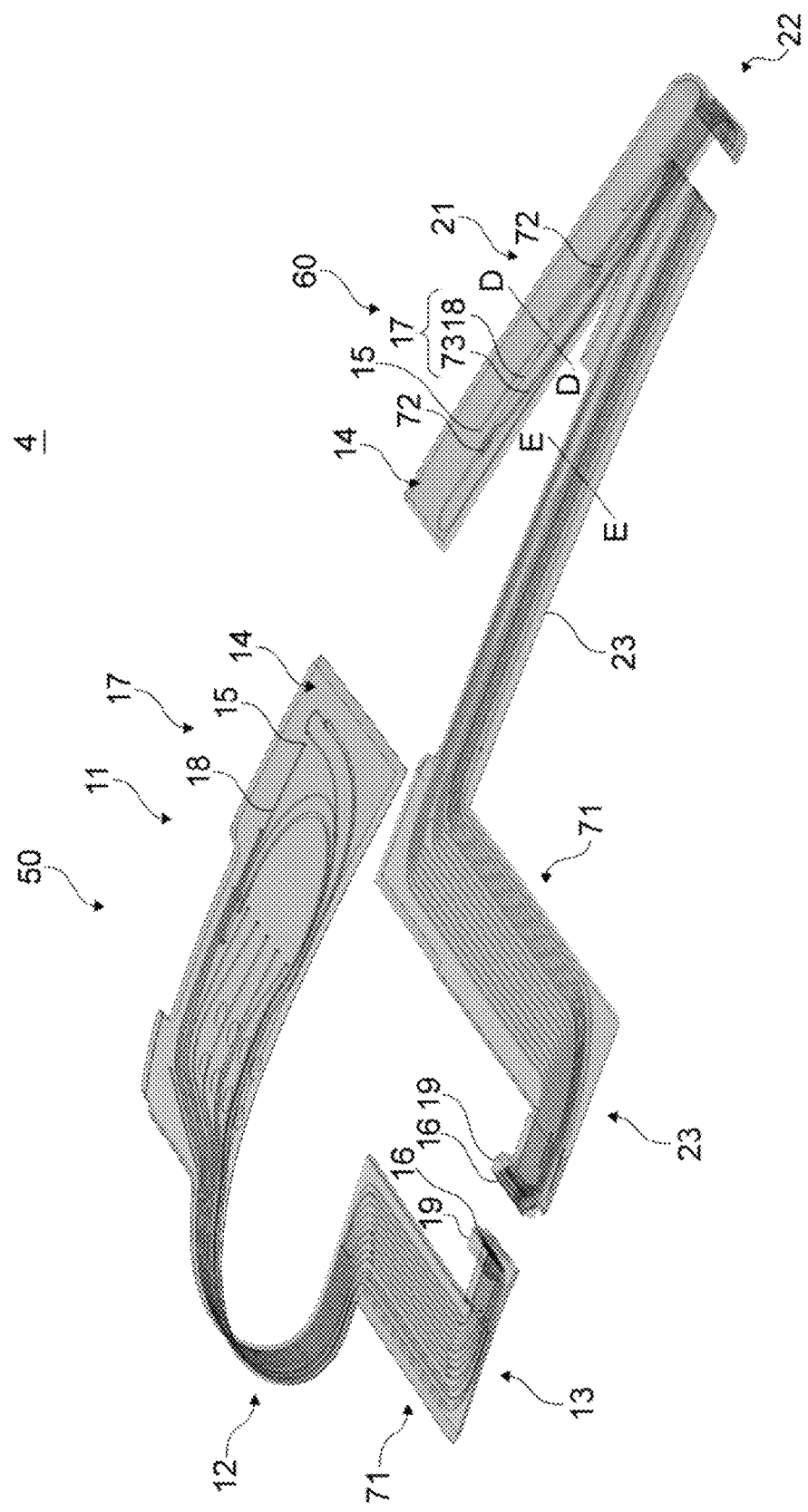
FIG. 6 is a perspective view showing the pressure measure sheet arranged on an outer board of the flap of FIG. 1.

Next, the pressure measure sheet 4 arranged on the outer board of the flap 2 of FIG. 1 will be described. FIG. 6 is a perspective view showing the pressure measure sheet 4.

The pressure measure sheet 4 includes the first pressure measure sheet 50 and the second pressure measure sheet 60. The first pressure measure sheet 50 is arranged on the topside and the underside of a front half region of the flap 2 such that the first pressure measure sheet 50 is arranged over a front rim of the flap 2. The second pressure measure sheet 60 is arranged on the topside and the underside of a rear half region of the flap 2 such that the first pressure measure sheet 50 is arranged over a rear rim of the flap 2.

Note that the same reference numerals are assigned to structural parts of the pressure measure sheet 4 similar to the structural parts of the pressure measure sheet 1, and description thereof will be omitted.

The first pressure measure sheet 50 includes a single body including the topside part 11, the front rim side part 12, the underside part 13, and, in addition, the connecting part 71 connecting the front rim side part 12 and the underside part 13. The second pressure measure sheet 60 includes a single body including the topside part 21 and the front rim side part 22. The second pressure measure sheet 60 includes a single body including the underside parts 23 and, in addition, the connecting part 71 connecting the divided underside parts 23 and 23. Typically, each connecting part 71 allows connection of the pressure measure port 15 and a pressure measure device via the first pressure measure sheet 50 or the second pressure measure sheet, even if a position of an inlet port at the underside of the flap 2 is displaced a large amount from a position of the pressure measure port 15 through the topside part 11 in a wing length direction. In other words, the pressure measure port 15 may be provided at a desired position irrespective of a position of an inlet port at the underside of the flap 2.

Figure 7:
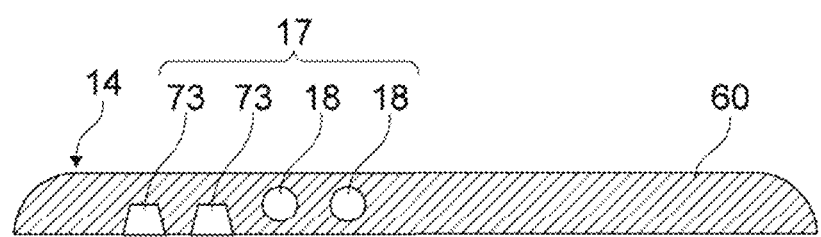
FIG. 7 is a D-D sectional view of FIG. 6.
Figure 8:
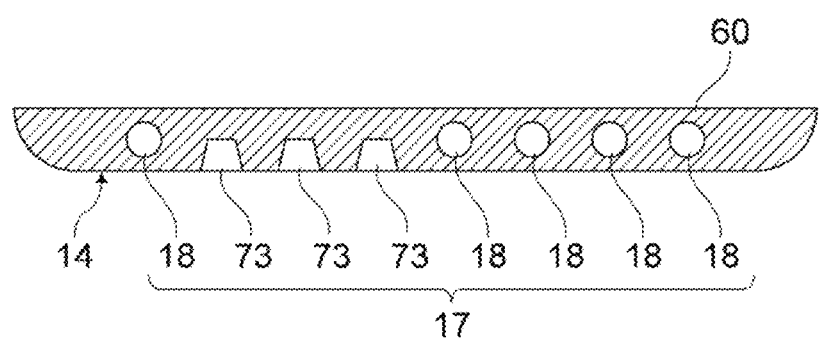
FIG. 8 is an E-E sectional view of FIG. 6.

FIG. 7 is a D-D sectional view of FIG. 6. FIG. 8 is an E-E sectional view of FIG. 6.

The coupler part 17 of the second pressure measure sheet 60 includes the coupling grooves 73 on a surface facing the surface of the flap 2 being a measured object, the coupling grooves 73 being adapted to route wiring (not shown) connected to a device (not shown) accommodated in the device accommodation part 72. For example, the device accommodation part 72 accommodates devices such as a non-stationary pressure sensor and a temperature measuring device. Then various physical amounts of the surface of the flap 2 being a measured object may be measured. Further, the coupling grooves 73 also function as a tube for protecting the wiring.

<Measuring Method Using Pressure Measure Sheet>

According to the present embodiment, as shown in FIG. 1, the pressure measure sheets 1, 4, and 5 are arranged on the surface of the flap 2. Each of the pressure measure sheets 1, 4, and 5 includes the plurality of pressure measure ports 15. The plurality of pressure measure ports 15 are provided through the pressure measure surface 14, and arrayed straight in a flow direction of fluid flowing on the surface of the flap 2.

In each of the pressure measure sheets 1, 4, and 5, the connection ports 16 are connected to a side of a pressure measure device via the interface part 19, the pressure measure sheet including the through-tubes 18, the through-tubes 18 penetrating the connection ports 16 and the pressure measure ports 15, respectively.

The pressure measure device measures a pressure of each of the pressure measure ports 15.

Therefore a pressure distribution may be measured accurately in a flow direction of fluid flowing on the surface of the flap 2.

<Method of Manufacturing Pressure Measure Sheet>

Figure 9:
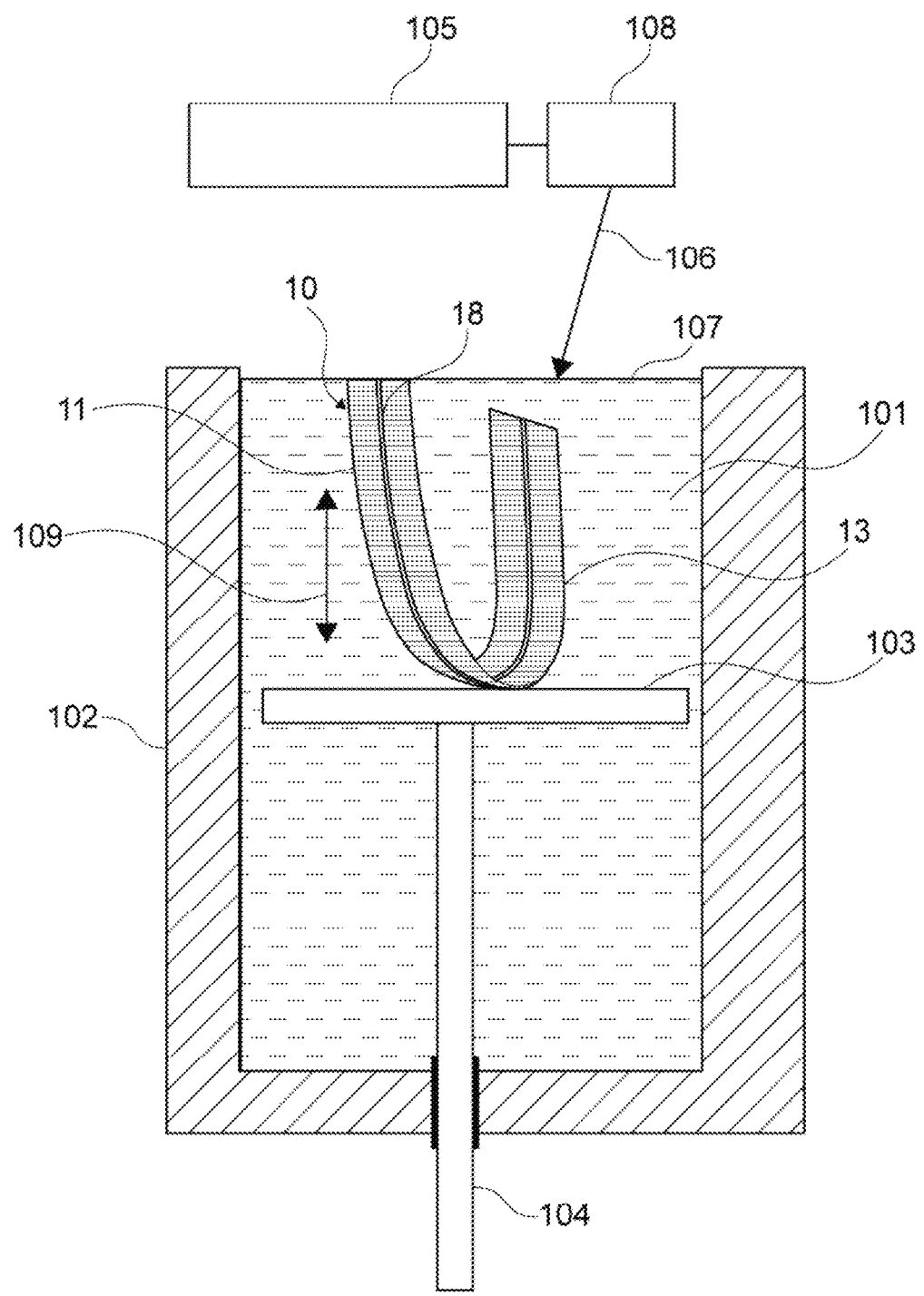
FIG. 9 is a diagram schematically showing a photo-solidification apparatus for manufacturing a pressure measure sheet of an embodiment of the present disclosure.

FIG. 9 is a diagram schematically showing a photo-solidification apparatus for manufacturing a pressure measure sheet of the present embodiment.

The photo-solidification apparatus 100 includes the bath 102, the platform 103, and the piston 104. The bath 102 stores the photo-curable resin 101. The platform 103 is arranged in the bath 102, and is capable of ascending and descending in the bath 102. The piston 104 is attached on the underside of the platform 103. The piston 104 is structured to ascend and descend driven by a drive mechanism (not shown). The platform 103 is structured to descend step-by-step by a predetermined distance, for example, about 0.1 mm, by the drive mechanism during fabrication.

The photo-solidification apparatus 100 includes the laser light source 105 and the scanner system 108. The laser light source 105 outputs the laser light 106. The scanner system 108 scans the liquid surface 107 of the photo-curable resin 101 stored in the bath 102 with the laser light 106. The laser light 106 of the photo-solidification apparatus 100 scans the liquid surface 107 of the photo-curable resin 101 to thereby form layers (thin layers) having shapes depending on scanning. The layers are laminated, and thereby a fabricated object (laminated structure) is fabricated.

A typical example of fabricating a single body of the first pressure measure sheet 10 by the photo-solidification apparatus 100 will be described.

The first pressure measure sheet 10 is fabricated by laminating layers in the first direction 109 by the photo-solidification apparatus 100. The first direction 109 is, in fact, the elongated direction of the topside part 11 and the underside part 13. The present elongated direction is the elongated direction of the present disclosure. The elongated direction of the topside part 11 and the underside part 13 is the first direction 109 in which the through-tubes 18 have the largest length in its axial direction. In other words, according to the manufacturing method of the present disclosure, the first pressure measure sheet 10 is fabricated by laminating layers in the first direction 109, in which the through-tubes 18 have the largest length in its axial direction, by using the photo-solidification method. As a result, it is possible to provide the through-tubes 18 with a high degree of accuracy without clogging the through-tubes 18.

<Notes>

Figure 10:
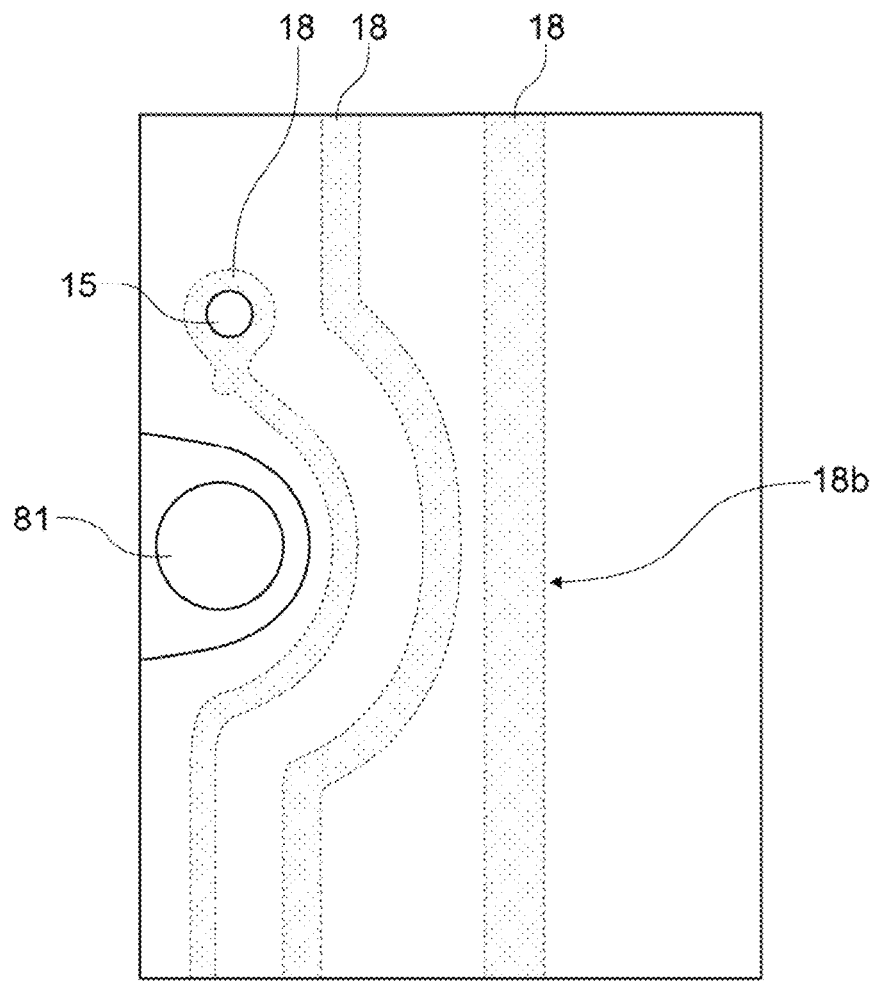
FIG. 10 is a plan view illustrating a modification example of the present disclosure.

According to the present embodiment, each of the pressure measure sheets 1, 4, and 5 is fabricated by the photo-solidification method, and has the region 18b in which the through-tubes 18 are arrayed in nonparallel. Therefore there are less constraints of the shape and pressure measured positions. Free layout of pressure measure points is allowed. The fluid phenomena of the surface of the flap 2 being a measured object may be understood in more detail. Typically, pressure measure points may be arranged straight in a flow direction of airflow. Further, the pressure measure ports 15 may also be provided on the rear rim side part 22, and pressure measure points may also be provided a rear rim side. In other words, pressure measure points may be arranged in not only an airflow direction but also a direction perpendicular to the airflow direction. Further, as shown in FIG. 10, if the protruding object 81 such as a rivet is on the surface of the flap 2 being a measured object, the through-tubes 18 may be provided while negotiating the protruding object 81, and pressure measure points (pressure measure ports 15) may be provided at positions behind the protruding object 81. As a result, pressure at a rear rim side and pressure behind the protruding object 81 may be measured.

Further, according to the present embodiment, each of the fabricated pressure measure sheets 1, 4, and 5 may have a shape of a corner slope or rounded corner and has a small thickness. As a result, the pressure measure sheets 1, 4, and 5 do not cause airflow turbulence. As a result, safety of experiment is increased, and accuracy of measurements is increased.

The present disclosure is not limited to the aforementioned embodiment. It should be understood by those skilled in the art that various modifications, combinations, sub-combinations and alterations may occur depending on design requirements and other factors insofar as they are within the scope of the appended claims or the equivalents thereof.

For example, the aforementioned embodiment employs an example in which the pressure measure sheet of the present disclosure is used to measure a pressure distribution of a flap of an aircraft. The pressure measure sheet of the present disclosure may be used to measure a pressure distribution of another part of an aircraft. The pressure measure sheet of the present disclosure may be used in various fields other than an aircraft such as a transportation machine (e.g., spacecraft, railroad, vehicle, etc.) and a fluid machine (e.g., air conditioner, fan, windmill, etc.). The pressure measure sheet of the present disclosure may be used in fields that require a pressure distribution measurement.

Further, the pressure measure sheet of the present disclosure may be used not only for experiments but also measurement as usual. For example, the pressure measure sheet of the present disclosure may be used to measure a pressure distribution during usual flight while the pressure measure sheet is attached on a flap of an aircraft.

What is claimed is:

1. A pressure measure sheet having a sheet shape and having a pressure measure surface, the pressure measure sheet being adapted to be arranged on a surface of a measured object, the pressure measure sheet comprising:
   a plurality of pressure measure ports provided through the pressure measure surface;
   at least one connection port adapted to be connected to a side of a pressure measure device; and
   a coupler part including a plurality of through-tubes penetrating the plurality of pressure measure ports and the at least one connection port,
   wherein the pressure measure sheet includes a region in which the plurality of through-tubes are arrayed in nonparallel.

2. The pressure measure sheet according to claim 1, wherein
   the plurality of through-tubes are provided in an elongated direction of the pressure measure sheet, and
   the pressure measure sheet includes a laminated structure laminated in the elongated direction.

3. The pressure measure sheet according to claim 1, further comprising:
   a device accommodation part adapted to accommodate a device, wherein
   the coupler part includes a coupling groove on a surface facing the surface of the measured object, the coupling groove being adapted to route wiring connected to the device accommodated in the device accommodation part.

4. The pressure measure sheet according to claim 1, wherein
   the plurality of pressure measure ports are arrayed on a straight line in a plan view of the pressure measure sheet in a flow direction of fluid adapted to flow on a surface of the measured object.

5. The pressure measure sheet according to claim 1, wherein
   the measured object is a flap of an aircraft,
   the pressure measure sheet is adapted to be arranged on a topside, a rim part, and an underside of the flap of the aircraft, and
   the at least one connection port is adapted to be positioned at the underside of the flap of the aircraft.

6. A method of manufacturing a pressure measure sheet, the pressure measure sheet having a pressure measure surface, the pressure measure sheet being adapted to be arranged on a surface of a measured object, the pressure measure sheet including
   a plurality of pressure measure ports provided through the pressure measure surface,
   at least one connection port adapted to be connected to a side of a pressure measure device, and
   a coupler part including a through-tube penetrating the plurality of pressure measure ports and the at least one connection port, the through-tube being provided in an elongated direction,
   the method of manufacturing a pressure measure sheet comprising:
   laminating thin layers in the elongated direction of the pressure measure sheet by a laminated object manufacturing method to fabricate a single body including the plurality of pressure measure ports, the at least one connection port, and the coupler part.

7. A pressure measuring method, comprising:
   arranging a pressure measure sheet on a surface of a measured object, the pressure measure sheet having a pressure measure surface, the pressure measure sheet at least including a plurality of pressure measure ports provided through the pressure measure surface, the plurality of pressure measure ports being arrayed on a straight line in a plan view of the pressure measure sheet in a flow direction of fluid adapted to flow on the surface of the measured object;
   connecting a connection port to a side of a pressure measure device, the pressure measure sheet including through-tubes, the through-tubes penetrating the connection port and the plurality of pressure measure ports, respectively; and
   measuring a pressure of each of the plurality of pressure measure ports by the pressure measure device.

* * * * *